United States Patent
Callaway

(10) Patent No.: US 12,511,770 B2
(45) Date of Patent: Dec. 30, 2025

(54) IMAGE ANALYSIS METHOD FOR MULTI-PHASE SYSTEM WITH OVERLAPPING GRAYSCALE INTENSITIES

(71) Applicant: Raytheon Technologies Corporation, Farmington, CT (US)

(72) Inventor: Evan B. Callaway, Santa Barbara, CA (US)

(73) Assignee: RTX Corporation, Farmington, CT (US)

( * ) Notice: Subject to any disclaimer, the term of this patent is extended or adjusted under 35 U.S.C. 154(b) by 403 days.

(21) Appl. No.: 18/223,912

(22) Filed: Jul. 19, 2023

(65) Prior Publication Data
US 2025/0029268 A1  Jan. 23, 2025

(51) Int. Cl.
*G06T 7/60* (2017.01)
*G06T 5/20* (2006.01)
(Continued)

(52) U.S. Cl.
CPC .......... *G06T 7/60* (2013.01); *G06T 5/20* (2013.01); *G06T 5/70* (2024.01); *G06T 7/11* (2017.01);
(Continued)

(58) Field of Classification Search
CPC .... G06T 7/60; G06T 5/20; G06T 5/70; G06T 7/11; G06T 7/136; G06T 7/155; G06T 7/70; G06T 2207/10061; G06T 2207/20072; G06T 2207/20152; G06T 2207/30108; G06T 7/0004; G06T 7/12; G06T 7/62; G01B 15/02
See application file for complete search history.

(56) References Cited

U.S. PATENT DOCUMENTS

| 5,073,958 A | 12/1991 | Imme |
| 6,394,646 B1 | 5/2002 | Ringermacher et al. |

(Continued)

FOREIGN PATENT DOCUMENTS

| CN | 101514895 B | 9/2011 |
| DE | 69931253 T2 | 6/2006 |

OTHER PUBLICATIONS

Extended European Search Report for EP Application No. 24188473.3, dated Dec. 16, 2024, 6 pages.

*Primary Examiner* — Matthew C Bella
*Assistant Examiner* — Andrew B. Jones
(74) *Attorney, Agent, or Firm* — Kinney & Lange, P.A.

(57) ABSTRACT

A method for determining coating thicknesses of a coated fiber embedded in a matrix is presented. A scanning electron microscope (SEM) image is captured of a composite material having multiple coated fibers embedded in a matrix. This image depicts a cross-sectional portion of the composite material. A processor identifies a region of the image depicting a cross-section of one among the plurality of coated fibers, and generates a line graph of a gradient of grayscale values as a function of a line scan. The line scan traverses across the image along a radius of the coated fiber, and extends between an interior location of the coated fiber and an exterior region outside the coated fiber. The processor identifies inflection points in the line graph of the gradient of grayscale values as a function of the line scan traverse location, and determines coating thickness based on these inflection points.

20 Claims, 4 Drawing Sheets

(51) Int. Cl.
*G06T 5/70* (2024.01)
*G06T 7/11* (2017.01)
*G06T 7/136* (2017.01)
*G06T 7/155* (2017.01)
*G06T 7/70* (2017.01)

(52) U.S. Cl.
CPC .............. *G06T 7/136* (2017.01); *G06T 7/155* (2017.01); *G06T 7/70* (2017.01); *G06T 2207/10061* (2013.01); *G06T 2207/20072* (2013.01); *G06T 2207/20152* (2013.01)

(56) References Cited

U.S. PATENT DOCUMENTS

| | | |
|---|---|---|
| 10,991,101 B2 | 4/2021 | Brada et al. |
| 2020/0384704 A1* | 12/2020 | Aratani ..................... C08J 5/06 |
| 2021/0332482 A1 | 10/2021 | Hazel et al. |
| 2022/0289633 A1* | 9/2022 | Okamura .............. C04B 35/645 |
| 2024/0003015 A1* | 1/2024 | Ramm .................... C23C 16/50 |

* cited by examiner

IMAGE ANALYSIS METHOD FOR MULTI-PHASE SYSTEM WITH OVERLAPPING GRAYSCALE INTENSITIES

BACKGROUND

Fiber-reinforced ceramic matrix composites (CMCs) are known and used for components that are exposed to high temperatures and corrosive conditions that can degrade other kinds of materials. Under such severe conditions, such as the operating conditions in aerospace and aircraft applications, even ceramic materials are vulnerable to degradation. Over time, ceramic composites can form microcracks that further expose the ceramic material to oxygen or other corrosive elements, which form undesirable phases to the detriment of the properties of the ceramic matrix composite component. Fibers can be coated with one or more interfacial coatings (IFC) to form a weak interface between the fibers and matrix material to enable desired composite characteristics. A thickness of the IFC can be measured to quantitatively evaluate the mechanical properties of the IFC or fiber-matrix interface.

Imagine analysis to measure mechanical properties of IFCs commonly requires segmentation, i.e. definition of regions of interest (e.g. of particular materials or phases). Segmentation for image analysis typically involves a global or local threshold that identifies phases based on grayscale intensity values. This works well for segmenting multiple layers of boron nitride (BN) and silicon carbide (SiC). Scanning electron microscopy (SEM) imaging with a back-scattered electron detector (BSD) can be used to produce images of the material layers which can be segmented using grayscale analysis. The grayscale intensities of the image depend on the atomic number of the material. Because SiC is heavier than BN, SiC is clearly distinguished from the BN SEM images thereby allowing for thresholding techniques to be of use for phase segmentation. Segmentation of next generation interfacial coatings (IFC) containing one or more layers of silicon-doped boron nitride (SiBN) poses a new challenge as the contrast of the SiBN layer may overlap with either a neighboring BN layer or SiC layer depending on the local concentration of silicon in SiBN and the brightness/contrast settings chosen by the SEM user. Traditional thresholding techniques fail to accurately capture the layer boundaries when these intensities overlap leading to error in measured BN and SiBN thickness. Standard thresholding methods developed for analysis of traditional BN IFCs are unreliable for segmenting BN, SiBN & SiC layers in the next generation IFCs. Thresholding parameters cannot be automated due to differences from image to image or batch to batch as changing process parameters between chemical vapor infiltration (CVI) IFC runs or locations within a CVI reactor lead to different concentrations of silicon in the SiBN layer. This leads to differences in the grayscale intensity for this phase, which could either overlap with the BN, or the SiC, or both BN and SiC.

A new thresholding method and image analysis routine is needed to accurately measure BN and SiBN thickness as well as other material layers for next generation IFC development.

SUMMARY

In one embodiment, this disclosure presents a method for determining coating thicknesses of a coated fiber embedded in a matrix is presented. According to this method, a scanning electron microscope (SEM) image is captured of a composite material having multiple coated fibers embedded in a matrix. This image depicts a cross-sectional portion of the composite material. A processor identifies a region of the image depicting a cross-section of one among the plurality of coated fibers, and generates a line graph of a gradient of grayscale values as a function of a line scan. The line scan traverses across the image along a radius of the coated fiber, and extends between an interior location of the coated fiber and an exterior region outside the coated fiber. The processor identifies inflection points in the line graph of the gradient of grayscale values as a function of the line scan traverse location, and determines coating thickness based on these inflection points.

In another embodiment, this disclosure presents a system for segmenting a scanning electron microscope (SEM) image based on grayscale inflection points. This system includes an SEM with a backscatter electron detector, a processor, and a computer readable memory. The computer readable memory contains instructions that, when executed by the processor, cause the system to capture an SEM image of the ceramic matrix composite, identify a fiber in the SEM image, and generate a line graph of a gradient of grayscale values as a function of a line scan traversing across the SEM image. These instructions, when executed by the processor, cause the system to identify a plurality of inflection points in the line graph and determine coating thickness based on these identified inflection points.

The present summary is provided only by way of example, and not limitation. Other aspects of the present disclosure will be appreciated in view of the entirety of the present disclosure, including the entire text, claims and accompanying figures.

Figure 1:
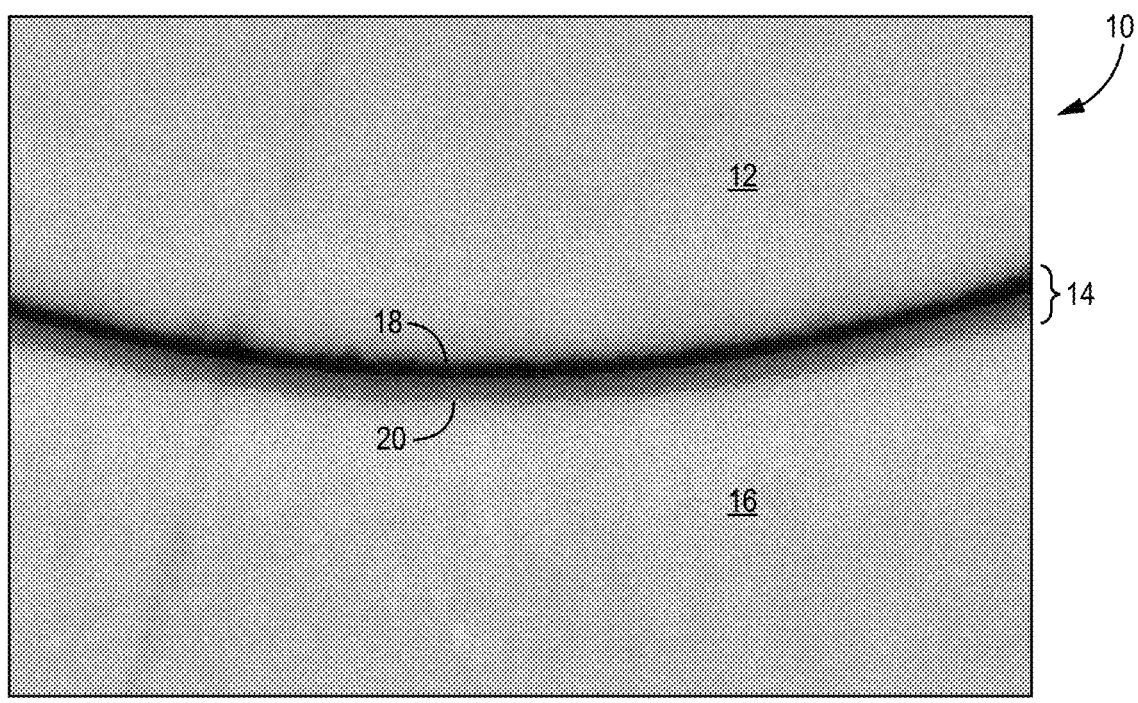
FIG. 1 is a grayscale backscatter electron SEM image of a portion of a multilayer composite material.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The disclosed thresholding method and image analysis routine has been developed to accurately measure boron nitride (BN) and silicon-doped boron nitride (SiBN) thickness for next generation interfacial coating (IFC) development. While discussed in the context of ceramic matrix composite (CMC) materials, the disclosed method is not restricted to CMCs or to the materials of the disclosed IFC system.

The disclosed method can be applied to other material systems comprising three phases with similar grayscale contrast on scanning electron microscope (SEM) images.

The disclosed image analysis method consists of two parts: (1) phase segmentation and (2) thickness measurement of segmented layers. The disclosed method is fully automated to process batches of SEM images generated by backscattered electron detection.

During phase segmentation, an image processing software code rasters across an SEM image to detect inflection points indicating a local transition between phases of material of the IFC. Once the layers are segmented, the image processing software code uses a maximum inscribed circle (MIC) method to measure the local thickness in the IFC phases. Implementation of the disclosed inflection point-based method has proved to accurately segment layers in a fully automated manner across multiple batches and locations within a chemical vapor infiltration (CVI) reactor.

FIG. 1 is a grayscale backscatter electron SEM image of a portion of a multilayer composite material. Specifically, FIG. 1 shows a portion of ceramic matrix composite (CMC) 10 with fiber 12, IFC system 14, and matrix 16. CMC 10 can be suitable for use in, for example, a gas turbine engine. Although not visible in FIG. 1, fiber 12 is generally circumscribed by IFC system 14 and matrix 16. The various layers of IFC system 14 are coaxial with one another and fiber 12. Fiber 12 can be formed from silicon carbide (SiC) or other suitable ceramic material. In the embodiment disclosed herein, fiber 12 is SiC. Multiple fibers 12 of the encompassing CMC 10 can be arranged in various woven or non-woven, unidirectional or multidirectional architectures. Individual fibers 12 have a lengthwise, major dimension disposed along longitudinal fiber axis. Woven architectures, in particular, may include multiple, offset (i.e., orthogonal or otherwise angled) longitudinal fiber axes, albeit falling within a common plane of the encompassing fabric or ceramic layer. Matrix 16 can be SiC or other ceramic material. In the embodiment disclosed herein, matrix 16 is formed from SiC.

Beginning closest to fiber 12 and working radially outward toward matrix 16, IFC system 14 includes inner layer 18 and outer layer 20. As used herein, the terms "inner" and "outer" are relative to one another and fiber 12, such that outer layer 20 is positioned further from fiber 12 than inner layer 18 and is radially outward from inner layer 18. In the disclosed embodiment, inner layer 18 is BN and outer layer 20 is SiBN. Alternative materials can be used to form IFC system 14 and the disclosed thresholding method and image analysis routine is not limited to the materials disclosed or to a particular number of material layers. The disclosed thresholding method and image analysis routine can be used to analyze multiphase systems having IFCs having a single coating layer, two coating layers of differing materials, or more than two coating layers of differing materials.

FIG. 1 is a cross-sectional view of CMC 10 taken perpendicular to the longitudinal axis of fiber 12 such that the cross-sectional view of fiber 12 is circular. FIG. 1 shows a segment of fiber 12. The illustrated thickness of IFC system 14, including inner layer 18 and outer layer 20, is a radial thickness. As discussed further herein, image processing software code can be programmed to measure elongation metrics of fiber regions indicative of a relative fiber 12 tilt angle with respect to a normal angle. Image processing software code can be programmed to select one or more fiber regions in which the elongation metrics indicate an orientation of fiber 12 that is substantially normal to the cross-section (e.g., identify a circular cross-sectional profile of a cylindrical fiber) to obtain a purely radial thickness of IFC system 14. Image processing software code can additionally identify the longitudinal fiber axis (i.e., center of the fiber).

Rastering is conducted radially (along a radius of fiber 12), starting from an interior of fiber 12 and moving outward through inner layer 18 and outer layer 20 and into matrix 16. A Gaussian blur filter is used to smooth the SEM image and prevent detection of false inflection points. From each of a plurality of radial line scans, inflection points are obtained from a grayscale intensity profile shown in FIG. 2.

Figure 2:
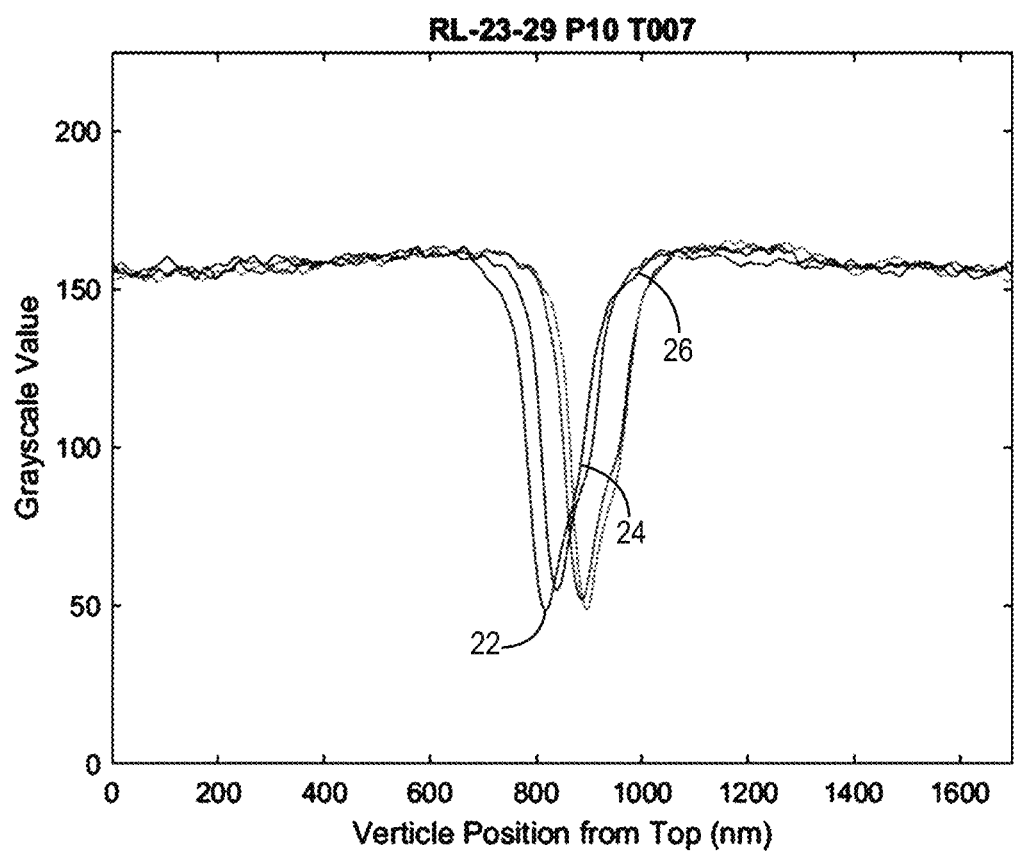
FIG. 2 is a line graph of a grayscale intensity profile of the SEM image of FIG. 1.

FIG. 2 is a line graph of a grayscale intensity profile of the SEM image of FIG. 1. FIG. 2 shows four line scans taken across the SEM image. FIG. 2 illustrates the grayscale intensity as a function of the line scan traverse location or the vertical position from the top of the SEM image measured in nanometers. Edges between at least some of the materials can be identified by changes in the grayscale value. For example, as shown in FIG. 2, the grayscale value line remains substantially constant from approximately 0 to 700 nm for a first line scan, which is indicative of a first material—in this case, fiber 12. A steep change in grayscale value from approximately 150 to 50 starting around 700 nm of the first line scan is indicative of the transition from fiber 12 to inner layer 18, indicated by feature 22 (grayscale minimum). Similarly, a steep change in grayscale value from approximately 50 back to 150 starting around 800 nm of the first line scan is indicative of a transition to matrix 16, indicated by feature 26 (grayscale maximum). The grayscale value remains substantially constant from around 1000 nm to 1700 nm of the first line scan, indicative of matrix 16. The transition from inner layer 18 to outer layer 20 is less discernible. As shown in FIG. 2, a slope of the first line scan 24 between feature 22 (grayscale minimum) and feature 26 (grayscale maximum) changes around 900 nm in the first line scan, which is presumably indicative of the transition between inner layer 18 and outer layer 20. This change is not apparent in all four line scans. While the grayscale intensity profile of FIG. 2 generally illustrates the location of material phases, the exact transition point from one material phase to the next is not discernible from the grayscale plot and, thus, thicknesses of inner layer 18 and outer layer 20 of IFC system 14 cannot be accurately determined from the grayscale intensity graph alone.

Figure 3:
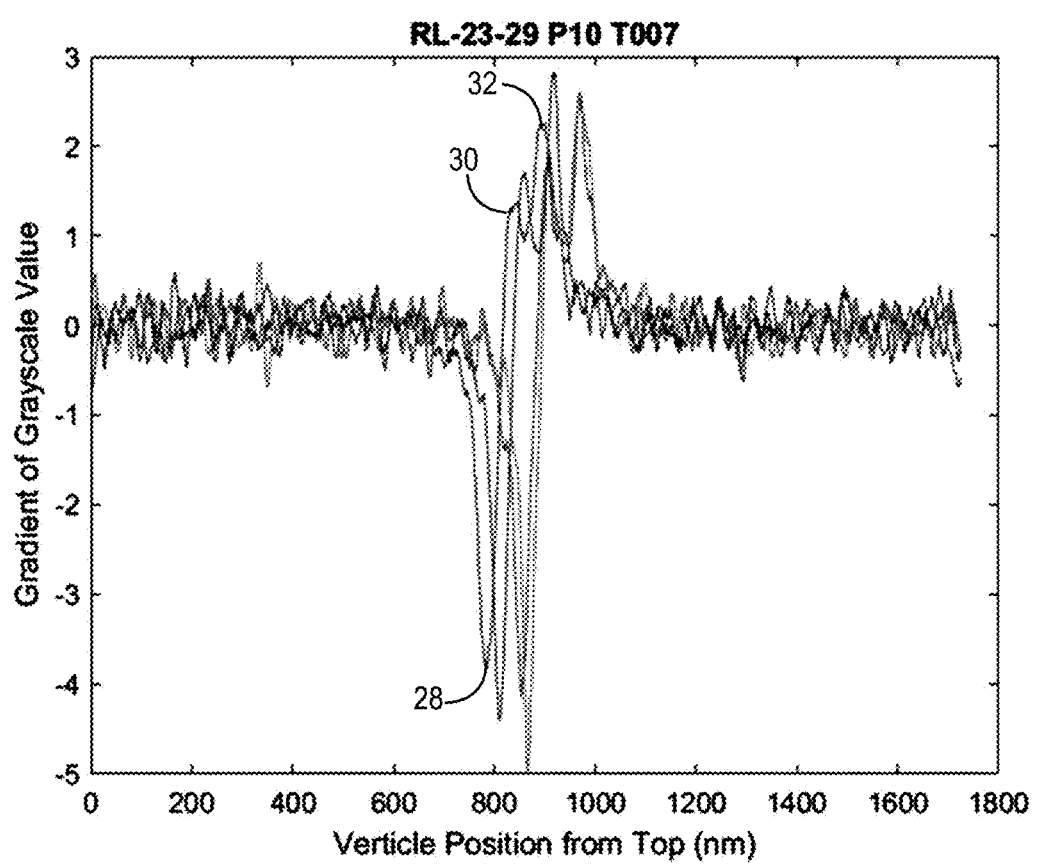
FIG. 3 is a line graph of the gradient of grayscale intensity values of FIG. 2.

A gradient line graph created by calculating a gradient of the radial line or grayscale line image of FIG. 2 as a function of the vertical position from the top of the SEM image measured in nanometers is used to accurately identify the location of inflection points or edges of material phases. FIG. 3 is a line graph of the gradient of grayscale intensity values of FIG. 2 for each of the four line scans as a function of the vertical position from the top of the SEM image. Each point of gradient of grayscale value is a difference in grayscale value of adjacent pixels in the line scan of FIG. 2. The locations of signal inflection points (i.e. where a gradient of grayscale meets a defined minimum threshold distinguishable from noise) indicate an edge between each phase of material. The image processing software code is programmed to search for three edge positions or inflection points: (1) fiber 12 to inner layer 18 edge 28, (2) inner layer 18 to outer layer 20 edge 30, and (3) outer layer 20 to matrix 16 edge 32. Although the code is specifically programmed to search for edge positions/inflection points of the disclosed fiber-IFC-matrix of interest, the code can identify any arbitrary number of phases or layers.

The image processing software code is programmed to identify a first minimum in the gradient grayscale line graph, which is indicative of a location of a first edge 28—in this case, a transition from fiber 12 to inner layer 18. The image processing software code is programmed to identify a first maximum in the gradient grayscale line graph, which is indicative of a location of a second edge 30—in this case, a transition from inner layer 18 to outer layer 20. The image processing software code is programmed to identify a second maximum in the gradient grayscale line graph, which is indicative of a location of a third edge 32—in this case, a transition from outer layer 20 to matrix 16. As illustrated in FIG. 3, the locations of edge 28 of fiber 12 and inner layer 18, edge 30 of inner layer 18 and outer layer 20, and edge 32 of and outer layer 20 and matrix 16 are clearly discernable, allowing accurate phase segmentation.

Once the material layers are segmented, the image processing software code uses a maximum inscribed circle (MIC) method to measure the local thickness of each of inner layer 18 and outer layer 20 across a circumferential length or arc of IFC system 14. The MIC method is performed through a watershed algorithm to obtain the number of pixels passing through local midpoints of each of inner layer 18 and outer layer 20. An evaluation of the Euclidean distance transform at the pixels provides the local MIC thickness of each layer (inner layer 18 and outer layer 20). The result is a measured thickness at each pixel along the circumferential length of the layer, which is typically over 1500 pixels for SEM images. The thickness profile can be used to obtain a root mean square (RMS) surface roughness for each of inner layer 18 and outer layer 20.

Automated SEM image analysis can be performed by an image analysis system including one or more processors and computer-readable memory encoded with instructions that, when executed by the one or more processors, cause to system operate in accordance with techniques described herein. Processor(s) are configured to implement functionality and/or process instructions for execution within the system.

Figure 4:
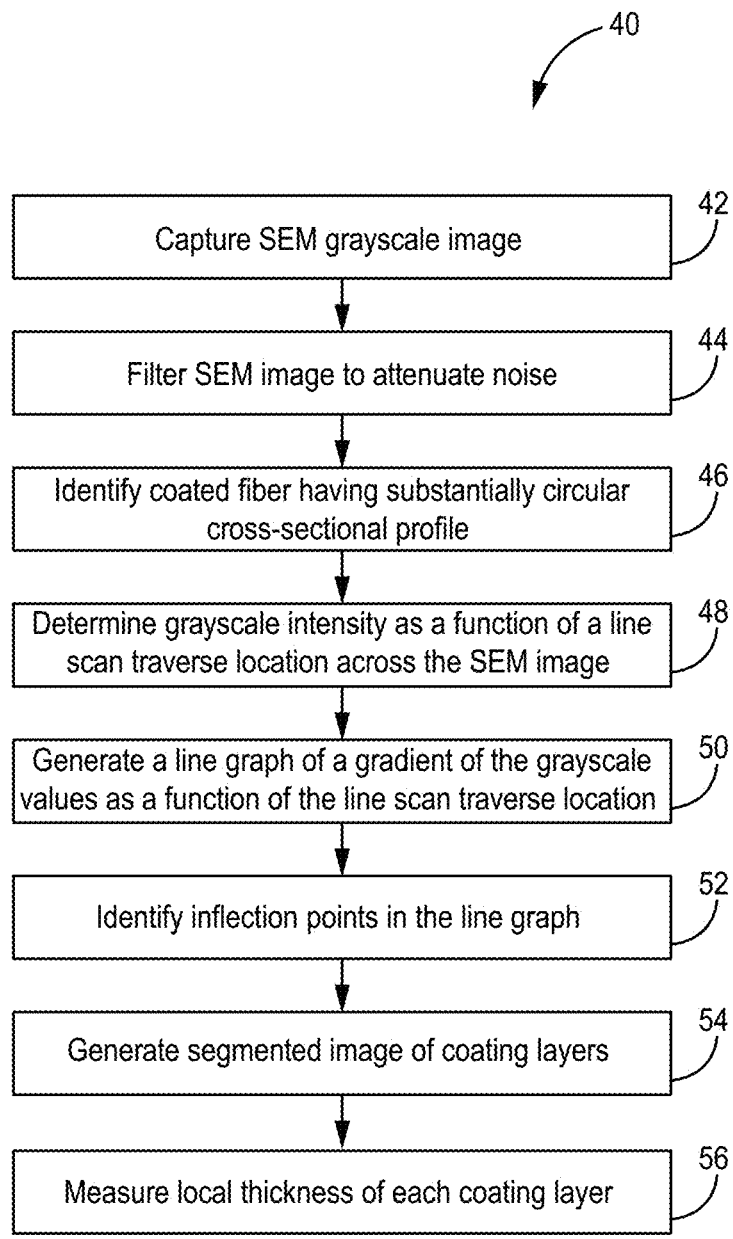
FIG. 4 is a flowchart of method 40 for image analysis.

FIG. 4 is a flowchart of method 40 for image analysis. In step 42, the disclosed system can be configured to receive an SEM grayscale image of a CMC that includes fibers 12 with IFC system 14 disposed in matrix 16 (e.g., as illustrated in FIG. 1). As previously disclosed, the SEM image can be generated by a backscattered electron detector. In step 44, the disclosed system can generate a filtered version of the SEM image to attenuate noise in the SEM image. Noise attenuation can be conducted, for example, by applying a Gaussian blur filter.

In step 46, the system can identify, in the filtered SEM image, a fiber 12 having a substantially circular cross-section. As previously discussed, the circular cross-section of fiber 12 indicates that an orientation (i.e., longitudinal axis) of fiber 12 and thereby orientation of IFC system 14 is normal to the cross-section, which is important for determining a radial thickness of IFC inner layer 18 and outer layer 20. Fibers 12 having an elongated cross-section can be excluded from image analysis as the elongated cross-sectional profile indicates that the fiber and thereby IFC system 14 has been cut at an angle. As such, a thickness of inner layer 18 and outer layer 20 may not be representative of a radial coating thickness.

In step 48, the system can raster across the SEM image along a radius of the selected fiber 12 having a circular cross-sectional profile. Rastering can start, for example, from a first location in an interior region of fiber 12 to an exterior region outside of fiber 12 and into matrix 16 to generate a line graph of grayscale intensity as a function of the line scan traverse location (e.g., as illustrated in FIG. 2). The grayscale line graph generally illustrates the transitions between fiber 12 and inner layer 18, inner layer 18 and outer layer 20, and outer layer 20 and matrix 16.

In step 50, the disclosed system can calculate and plot, in a line graph, a gradient of the grayscale values of the grayscale intensity line graph as a function of the line scan traverse location (e.g., as illustrated in FIG. 3). In step 52, the system can identify inflection points, which are indicative of edges between the different materials, i.e., fiber 12 and inner layer 18, inner layer 18 and outer layer 20, and outer layer 20 and matrix 16. For the disclosed CMC material, the system is configured to identify a first minimum of the gradient grayscale line graph and first and second maxima of the gradient grayscale line graph. The first minimum is indicative of the location of the transition from fiber 12 to inner layer 18 formed of BN. The first maximum is indicative of the location of the transition from inner BN layer 18 to outer layer 20 formed of SiBN. The second maximum is indicative of the location of the transition from outer SiBN layer 20 to matrix 16, formed of SiC. For other IFC systems 14, the number and order of maxima and minima may differ. In general, a transition from a brighter to darker phase is identified via a local minimum in the gradient and a transition from a darker to brighter phase is identified via a local maximum in the gradient. The image processing software code can segment any arbitrary number of IFC layers. For example, the image processing software code can be configured to identify a first minimum or maximum, a second minimum or maximum, a third minimum or maximum, and any number of additional minimums or maximums depending on the number of material layers. The first minimum or maximum can be indicative of the location of the transition from the fiber to a first coating layer. The second minimum or maximum can be indicative of the location of the transition from the first coating layer to a second coating layer of different material. The third minimum or maximum can be indicative of the location of the transition from the second coating layer to a third coating layer of different material or to the matrix, and so on.

In step 54, the system can generate a segmented image (not shown) of inner layer 18 and outer layer 20 based on the identified first minimum and first and second maxima across a circumferential length or arc of IFC system 14.

In step 56, the system can measure the local thickness of each of inner layer 18 and outer layer 20 across the circumferential length or arc of IFC system 14 using an MIC method. As previously described, the MIC method is performed through a watershed algorithm to obtain the number of pixels passing through local midpoints of each of inner layer 18 and outer layer 20. Evaluation of the Euclidean distance transform at the pixels provides the local MIC thickness of each layer (inner layer 18 and outer layer 20). The result is a measured thickness at each pixel along the circumferential length of each layer. In addition to determining layer thickness, the thickness profile can be used to obtain an RMS surface roughness for each of inner layer 18 and outer layer 20.

The disclosed thresholding method and image analysis routine can accurately measure BN and SiBN thickness in IFCs. While discussed in the context of CMC materials, the disclosed image analysis system and method is not restricted to CMCs but can be adapted for use with other multiphase materials with similar overlapping grayscale intensities in SEM images.

DISCUSSION OF POSSIBLE EMBODIMENTS

The following are non-exclusive descriptions of possible embodiments of the present invention.

A method for determining coating thicknesses of a coated fiber embedded in a matrix, the method comprising: capturing, via a scanning electron microscope (SEM), an SEM image of a composite material having a plurality of coated fibers embedded in a matrix, the SEM image depicting a cross-sectional portion of the composite material; identifying, via a processor, a region of the SEM image depicting a cross-section of a coated fiber of the plurality of coated fibers; generating, via the processor, a line graph of a gradient of grayscale values as a function of a line scan traverse location, the line scan traversing across the SEM image along a radius of the coated fiber, the line scan extending between a first location in an interior region of the coated fiber to an exterior region outside the coated fiber; identifying, via the processor, a plurality of inflection points in the line graph of the gradient of grayscale values as a function of the line scan traverse location; and determining, via the processor, coating thicknesses based on the identified inflection points.

The method of the preceding paragraph can optionally include, additionally and/or alternatively, any one or more of the following features, configurations and/or additional components:

A further embodiment of the foregoing method, wherein the coated fiber comprises a first coating layer and a second coating layer, wherein materials forming the first and second coating layers differ.

A further embodiment of the foregoing method, wherein the first coating layer is an inner coating layer disposed between the fiber and the second coating layer and wherein the first coating layer is boron nitride.

A further embodiment of the foregoing method, where the second coating layer is silicon-doped boron nitride.

A further embodiment of the foregoing method, wherein the matrix is silicon carbide.

A further embodiment of the foregoing method, wherein identifying the plurality of inflection points in the line graph comprises: identifying a first minimum or maximum in the line graph, the first minimum or maximum indicative of a material transition from the fiber to the first coating layer; identifying a second minimum or maximum in the line graph, the second minimum or maximum indicative of a material transition from the first coating layer to the second coating layer; and identifying a third minimum or maximum in the line graph, the third minimum or maximum indicative of a material transition from the second coating layer to a third coating layer or to the matrix.

A further embodiment of the foregoing method, wherein determining coating thicknesses based on the identified inflection points comprises generating a segmented image based on the identified first minimum or maximum, the second minimum or maximum, and the third minimum or maximum using a maximum inscribed circle method and watershed algorithm.

A further embodiment of the foregoing method, wherein identifying a region of the SEM image depicting a cross-section of a coated fiber comprises identifying a coated fiber having a circular cross-sectional profile.

A further embodiment of the foregoing method, wherein identifying a region of the SEM image depicting a cross-section of a coated fiber further comprises: measuring an elongation metric of a plurality of fibers in the SEM image, the elongation metric indicative of a relative tilt angle with respect to a cross-sectional plane; and selecting a fiber region in which the elongation metric indicates a fiber that is oriented with a longitudinal axis substantially normal to the cross sectional plane.

A further embodiment of the foregoing method, further comprising applying, via the processor, a filter to the SEM image to smooth and attenuate noise in the SEM image.

A further embodiment of the foregoing method, further comprising generating, via the processor, a line graph of grayscale values as a function of the line scan traverse location.

A further embodiment of the foregoing method, further comprising determining, via the processor, the root mean square surface roughness of the first coating layer and the second coating layer.

A system for segmenting a scanning electron microscope (SEM) image based on grayscale inflection points, the system comprising: an SEM with a backscattered electron detector; a processor; and a computer readable memory containing instructions that, when executed by the processor, cause the system to: capture an SEM image of a ceramic matrix composite that includes ceramic fibers coated with first coating layer of a first material and a second coating layer of a second material, the second material different from the first material; identify a fiber in the SEM image, the fiber having a substantially circular cross-sectional profile; generate a line graph of a gradient of grayscale values as a function of a line scan traverse location, the line scan traversing across the SEM image along a radius of the coated fiber, the line scan extending between a first location in an interior region of the coated fiber to an exterior region outside the coated fiber; identify a plurality of inflection points in the line graph of the gradient of grayscale values as a function of the line scan traverse location; and determine coating thicknesses based on the identified inflection points.

The system of the preceding paragraph can optionally include, additionally and/or alternatively, any one or more of the following features, configurations and/or additional components:

A further embodiment of the foregoing system, wherein the first coating layer is an inner coating layer disposed between the fiber and the second coating layer and wherein the first coating layer is boron nitride.

A further embodiment of the foregoing system, where the second coating layer is silicon-doped boron nitride.

A further embodiment of the foregoing system, wherein the matrix is silicon carbide.

A further embodiment of the foregoing system, wherein identification of the plurality of inflection points in the line graph comprises: identifying a first minimum in the line graph, the first minimum indicative of a material transition from the fiber to the first coating layer; identifying a first maximum in the line graph, the first maximum indicative of a material transition from the first coating layer to the second coating layer; and identifying a second maximum in the line graph, the second maximum indicative of a material transition from the second coating layer to the matrix.

A further embodiment of the foregoing system, wherein the determination of coating thicknesses is based on the identified inflection points and comprises generating a segmented image based on the identified first minimum and first and second maxima using a maximum inscribed circle method and watershed algorithm.

A further embodiment of the foregoing system, wherein identification of a fiber in the SEM image includes measuring an elongation metric of a plurality of fibers in the SEM image, the elongation metric indicative of a relative tilt angle with respect to a cross-sectional plane.

A further embodiment of the foregoing system, wherein instructions, when executed by the processor, further cause the system to: generate a filtered version of the SEM image thereby smoothing the image and attenuating noise in the SEM image.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for determining coating thicknesses of a coated fiber embedded in a matrix, the method comprising:
   capturing, via a scanning electron microscope (SEM), an SEM image of a composite material having a plurality of coated fibers embedded in a matrix, the SEM image depicting a cross-sectional portion of the composite material;
   identifying, via a processor, a region of the SEM image depicting a cross-section of a coated fiber of the plurality of coated fibers;
   generating, via the processor, a line graph of a gradient of grayscale values as a function of a line scan traverse location, the line scan traversing across the SEM image along a radius of the coated fiber, the line scan extending between a first location in an interior region of the coated fiber to an exterior region outside the coated fiber;
   identifying, via the processor, a plurality of inflection points in the line graph of the gradient of grayscale values as a function of the line scan traverse location; and
   determining, via the processor, coating thicknesses based on the identified inflection points.

2. The method of claim 1, wherein the coated fiber comprises a first coating layer and a second coating layer, wherein materials forming the first and second coating layers differ.

3. The method of claim 2, wherein the first coating layer is an inner coating layer disposed between the fiber and the second coating layer and wherein the first coating layer is boron nitride.

4. The method of claim 3, where the second coating layer is silicon-doped boron nitride.

5. The method of claim 3, wherein the matrix is silicon carbide.

6. The method of claim 2, wherein identifying the plurality of inflection points in the line graph comprises:
   identifying a first minimum or maximum in the line graph, the first minimum or maximum indicative of a material transition from the fiber to the first coating layer;
   identifying a second minimum or maximum in the line graph, the second minimum or maximum indicative of a material transition from the first coating layer to the second coating layer; and
   identifying a third minimum or maximum in the line graph, the third minimum or maximum indicative of a material transition from the second coating layer to a third coating layer or to the matrix.

7. The method of claim 6, wherein determining coating thicknesses based on the identified inflection points comprises generating a segmented image based on the identified first minimum or maximum, the second minimum or maximum, and the third minimum or maximum using a maximum inscribed circle method and watershed algorithm.

8. The method of claim 1, wherein identifying a region of the SEM image depicting a cross-section of a coated fiber comprises identifying a coated fiber having a circular cross-sectional profile.

9. The method of claim 8, wherein identifying a region of the SEM image depicting a cross-section of a coated fiber further comprises:
   measuring an elongation metric of a plurality of fibers in the SEM image, the elongation metric indicative of a relative tilt angle with respect to a cross-sectional plane; and
   selecting a fiber region in which the elongation metric indicates a fiber that is oriented with a longitudinal axis substantially normal to the cross sectional plane.

10. The method of claim 1, further comprising applying, via the processor, a filter to the SEM image to smooth and attenuate noise in the SEM image.

11. The method of claim 1, further comprising generating, via the processor, a line graph of grayscale values as a function of the line scan traverse location.

12. The method of claim 1, further comprising determining, via the processor, the root mean square surface roughness of the first coating layer and the second coating layer.

13. A system for segmenting a scanning electron microscope (SEM) image based on grayscale inflection points, the system comprising:
   an SEM with a backscattered electron detector;
   a processor; and
   a computer readable memory containing instructions that, when executed by the processor, cause the system to:
      capture an SEM image of a ceramic matrix composite that includes ceramic fibers coated with first coating layer of a first material and a second coating layer of a second material, the second material different from the first material;
      identify a fiber in the SEM image, the fiber having a substantially circular cross-sectional profile;
      generate a line graph of a gradient of grayscale values as a function of a line scan traverse location, the line scan traversing across the SEM image along a radius of the coated fiber, the line scan extending between a first location in an interior region of the coated fiber to an exterior region outside the coated fiber;
      identify a plurality of inflection points in the line graph of the gradient of grayscale values as a function of the line scan traverse location; and
      determine coating thicknesses based on the identified inflection points.

14. The system of claim 13, wherein the first coating layer is an inner coating layer disposed between the fiber and the second coating layer and wherein the first coating layer is boron nitride.

15. The system of claim 14, where the second coating layer is silicon-doped boron nitride.

16. The system of claim 15, wherein the matrix is silicon carbide.

17. The system of claim 16, wherein identification of the plurality of inflection points in the line graph comprises:
   identifying a first minimum in the line graph, the first minimum indicative of a material transition from the fiber to the first coating layer;
   identifying a first maximum in the line graph, the first maximum indicative of a material transition from the first coating layer to the second coating layer; and identifying a second maximum in the line graph, the second maximum indicative of a material transition from the second coating layer to the matrix.

18. The system of claim 17, wherein the determination of coating thicknesses is based on the identified inflection points and comprises generating a segmented image based on the identified first minimum and first and second maxima using a maximum inscribed circle method and watershed algorithm.

19. The system of claim 13, wherein identification of a fiber in the SEM image includes measuring an elongation metric of a plurality of fibers in the SEM image, the elongation metric indicative of a relative tilt angle with respect to a cross-sectional plane.

20. The system of claim 13, wherein instructions, when executed by the processor, further cause the system to:
    generate a filtered version of the SEM image thereby smoothing the image and attenuating noise in the SEM image.

* * * * *